(12) United States Patent
Nauerz et al.

(10) Patent No.: US 7,865,905 B2
(45) Date of Patent: Jan. 4, 2011

(54) CONTEXT-EXCHANGE MECHANISM FOR ACCUMULATING AND PROPAGATING CONTEXTUAL INFORMATION BETWEEN APPLICATIONS

(75) Inventors: Andreas Nauerz, Boeblingen (DE); Stefan Liesche, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 11/758,458

(22) Filed: Jun. 5, 2007

(65) Prior Publication Data

US 2008/0066079 A1 Mar. 13, 2008

(30) Foreign Application Priority Data

Sep. 11, 2006 (EP) .................................. 06120466

(51) Int. Cl.
*G06F 13/00* (2006.01)
(52) U.S. Cl. ..................... 719/318; 719/312; 719/313
(58) Field of Classification Search ................. 719/318, 719/312, 313
See application file for complete search history.

(56) References Cited

U.S. PATENT DOCUMENTS 7,711,705 B1 * 5/2010 Patsenker et al. ........... 707/613
2004/0064499 A1 * 4/2004 Kasravi ..................... 709/202

\* cited by examiner

*Primary Examiner*—Andy Ho
(74) *Attorney, Agent, or Firm*—David A. Dagg

(57) ABSTRACT

The present invention relates to the field of network computing, and in particular to method and system for designing a Web Portal including a hierarchical structure of portal pages and portlets for accessing Web contents accessible via the Portal. In order to increase the user comfort, a context exchange mechanism is includes defining a storage area for a single thread of processing by multiple applets on the Web portal, listening to events fired by each of the applets used by a user during processing by the multiple applets, collecting and storing the information associated with the listened to events in the storage area, wherein a piece of information is stored as a pair of an attribute and an attribute value, clustering the stored information into multiple different attributes, and propagating the clustered information automatically into the multiple applets.

11 Claims, 5 Drawing Sheets

CONTEXT-EXCHANGE MECHANISM FOR ACCUMULATING AND PROPAGATING CONTEXTUAL INFORMATION BETWEEN APPLICATIONS

CROSS REFERENCE TO RELATED APPLICATIONS

The present application claims priority under 35 USC 119 to European Application Number EP06120466, filed Sep. 11, 2006.

FIELD OF THE INVENTION

The present invention relates to the field of network computing, and in particular to a method and system for managing context information in a Web Portal or Enterprise Portal including a hierarchical structure of portal pages and portlets for accessing Web contents or Enterprise contents accessible via the Portal.

BACKGROUND OF THE INVENTION

FIG. 1 gives a schematic system view of a Portal server implementing a prior art Web Portal. A prior art Portal, for example as represented by IBM WebSphere Portal or by Jetspeed2 Enterprise Portal (www.Portals.apache.org/jetspeed-2/Portal-design.html), is built by a complex functionality implemented on a network server—for example a Web server 100, the most important elements of which are logic components for user authentication 105, state handling 110, aggregation 170 of fragments, a plurality of Portlets 120 (further described below) provided in respective pages 125 with a respective plurality of APIs 130 to a respective Portlet container software 135 for setting them into the common Web page context, and some Portal storage resources 140. The logic components are operatively connected such that data can be exchanged between single components as required. This is roughly depicted in FIG. 1.

In more detail, a Portal engine of the Web server in FIG. 1 implements an aggregation of Portlets 120 based on the underlying Portal model 150 and Portal information such as security settings, user roles, customization settings, and device capabilities. Within the rendered page, the Portal automatically generates the appropriate set of navigation elements based on the Portal model. The Portal engine invokes Portlets during the aggregation as required and when required and uses caching to reduce the number of requests made to Portlets. The prior art IBM WebSphere Portal employs open standards such as the Java Portlet API (application programming interface). It also supports the use of a remote Portlet via the WSRP (Web Services for Remote Portlets) standard.

The Portlet container 135 is a single control component competent for all Portlets 120, which may control the execution of code residing in each of these Portlets. It provides the runtime environment for the Portlets and facilities for event handling, inter-Portlet messaging, and access to Portlet instance and configuration data, among others. The Portal resources 140 are in particular the Portlets 120 themselves and the pages 125, on which they are aggregated in the form of an aggregation of fragments. A Portal database 128 stores the portlet description, featuring some attributes like portlet name, portlet description, portlet title, portlet short title, and keywords, as well as the portlet interaction interface description, which is often stored in the form of WSDL (Web Services Description Language) documents. The Portal database also stores the Portal content structure, i.e. the hierarchical structure of portal pages, which may again contain nested pages, and portlets. This data is stored in the database 128 in an adequate representation based on prior art techniques like relational tables.

The before-mentioned aggregation logic 170 includes all steps that are required to assemble a page. Typically, these steps are to load a content structure from storage, to traverse it and to call the instances referenced in the structure in order to obtain their output, which is assembled to a single page.

The content structure may be defined through, for example, Portlet Customization by the administrators or users and saved in the database, or by other ways, e.g. scripting, XML import, etc.

Web portals are often used to perform a semantically unitary business step, such as, for example, booking travel for a particular person. Typically, such a business step includes a plurality of distinct business items, which are processed separately in respective distinct portlets or generally, applets, respectively. For example, in the case of travel booking, one portlet may be used to book the flight, another portlet to book the hotel, and a third portal to book a rental car during the holidays. Possibly another portlet may be used for to employ a house keeping person for the holiday. Typically, these multiple applets or portlets are programmed and sold by different software producers. So, in general, they might be implemented in a single Web portal, but they have no common data interface for exchanging data.

When a user works within in a portal application having such multiple portlets, he will usually follow a certain flow of action, for example first booking the flight, then booking the hotel, then booking the rental car, etc. Business practice, however, shows that a person booking travel is often distracted from their work, for example by telephone calls requiring another piece of work more urgent than the one the user had already begun working on. As a result, he is constrained to leave his usual flow of work. In the travel booking example the user might be constrained to book a second travel booking before he has completed a first travel booking.

A first problem and disadvantage of existing systems relates to storing information a first user has already input into a portlet, when the same portlet is then used by another customer. Disadvantageously, existing Web applications, including existing Web portal software solutions, do not offer a good mechanism for intermediately storing such information. Unfortunately, such information often has a high business value, since it is often obtained by inputs from a customer. If such information has to be input a second time, this would represent an undue burden for a customer.

A second problem with existing systems is that even if a user succeeds in storing input data such as customer name, customer travel dates, customer hotel, etc. within a clipboard-like temporary storage, such as the Microsoft Windows® Clipboard, thus storing the data externally from the Web application, handling of this data storage is difficult because the data handling is managed on a different system level than that at which the user is working with. For example, the Windows Clipboard mechanism, which allows copying and pasting of such data, is implemented on the operating system level, whereas the user is working at a Web portal level. The problem is that the temporarily stored data must be selectively marked and separately pasted into respective input fields of the target portlet. Accordingly, a skilled reader easily appreciates that it is quite difficult to manage such copy-pasted data, other than by using an editor program, such as, for example, the Windows WordPad and the like.

More particularly, if a user is confronted with doing three distinct threads of travel bookings, for example for three different customers, then the handling of such an editor is quite complicated. Another disadvantage is that even if he manages to copy and paste correctly, then the user is constrained to copy-paste many data items separately, for example, first copying the first name of a person and pasting it into a respective field of a portlet, and then copying the last name and pasting it in a second field of the same portlet. However, as the user uses, for example, three portlets for booking a flight, hotel and the rental car, such manual copy-paste mechanisms are troublesome and error-laden. If the user is not equipped with enough screen area to display the editor window close to the portlet window, he even would be constrained to open and close the respective windows before pasting a data item into the correct field. Accordingly, data handling using such existing systems becomes quite complicated, and is not tolerable for serious and efficient business use.

It is accordingly an objective of the present invention to provide an improved method and system offering increased ease of use, and offering an improved data exchange mechanism.

SUMMARY OF THE INVENTION

The disclosed system offers a data exchange mechanism for exchanging data between multiple applets or portlets which belong to the same business context. Accordingly, context-specific information is collected and stored in a context-specific, temporarily used data container, which can be used for feeding the data collected therein selectively to different portlets, wherein the collected and stored information is automatically pre-processed, such that at least in most cases the correct data is used in the respective correct data field.

Thus, cases are avoided in which a street name is used for example as a first name of a customer. The disclosed system significantly eases the information retrieval itself, and solves practical problems of data handling the a user is confronted with, in particular when he is distracted during his usual flow of work.

According to a first aspect of the disclosed system, a method and a respective system to be operated in a Web application environment including Web pages and portlets (120) as Web application elements, is disclosed for automatically collecting context information, and using the collected context information within the Web environment, including:

a) defining a predefined storage area (referred to herein as a context container) for a single thread of processing multiple applets for performing a semantically unitary business step on the web portal, b) listening to all events fired by each of the applets used by a user during processing the multiple applets, c) automatically collecting and storing the information associated with the listened to events in the predefined storage area, wherein a piece of information is stored as a pair of:

c1) an attribute (e.g. customer name), and
  c2) an attribute value (e.g. MILLER), d) clustering the stored information into a plurality of such attributes, e) propagating the clustered information automatically into the respective correct input fields of the multiple applets.

The disclosed approach advantageously results in relevant context-specific information being automatically provided to the applet, or particular portlet instance used, for a specific context. For example, one client's travel booking data is collected within a single context, thus a client's process has its specific context container implemented in a particular logical storage area.

As to the terms used above and herein:

A single thread of processing multiple applets denotes a situation when the Web application is implemented within a single Portal environment, and for example a flight booking portlet, a hotel booking portlet and a rental car booking portlet are used sequentially in order to book a respective travel for a particular customer.

A semantically unitary business step is meant to be processed in a single context, for example for booking travel arrangements for one trip for one person.

Further examples of attributes include travel booking identifier, first name, last name, birth date, address of customer, telephone of customer, departure date, arrival date, etc. Those skilled in the art will recognize that applications other than travel booking have different attributes and attribute values.

As to the term "automatically collecting and storing the information associated with the listened events", a respective context exchange program component controls the output of the event listeners and directs them into an intermediate storage area, which is separately provided for each context. Thus, each collected piece of information, e.g. customer first name, preferably carries an identifier of a context, generated automatically by the disclosed method.

Alternatively, the portal user generates the context-ID, for example by manually assigning a key to a portlet from a machine-generated key list, when reading from such a portlet. The key list may include numbers from 0, . . . N, N being preferably a number smaller than 50, in order to keep the situation clear enough to the user.

BRIEF DESCRIPTION OF THE DRAWINGS

Embodiments of the present invention will now be described, by way of examples only, with reference to the accompanying drawings in which.

DETAILED DESCRIPTION OF EXEMPLARY EMBODIMENTS

With general reference to the Figures and with special reference now to FIG. 2, an illustrative embodiment of the present invention will be described in more detail next below.

Figure 1:
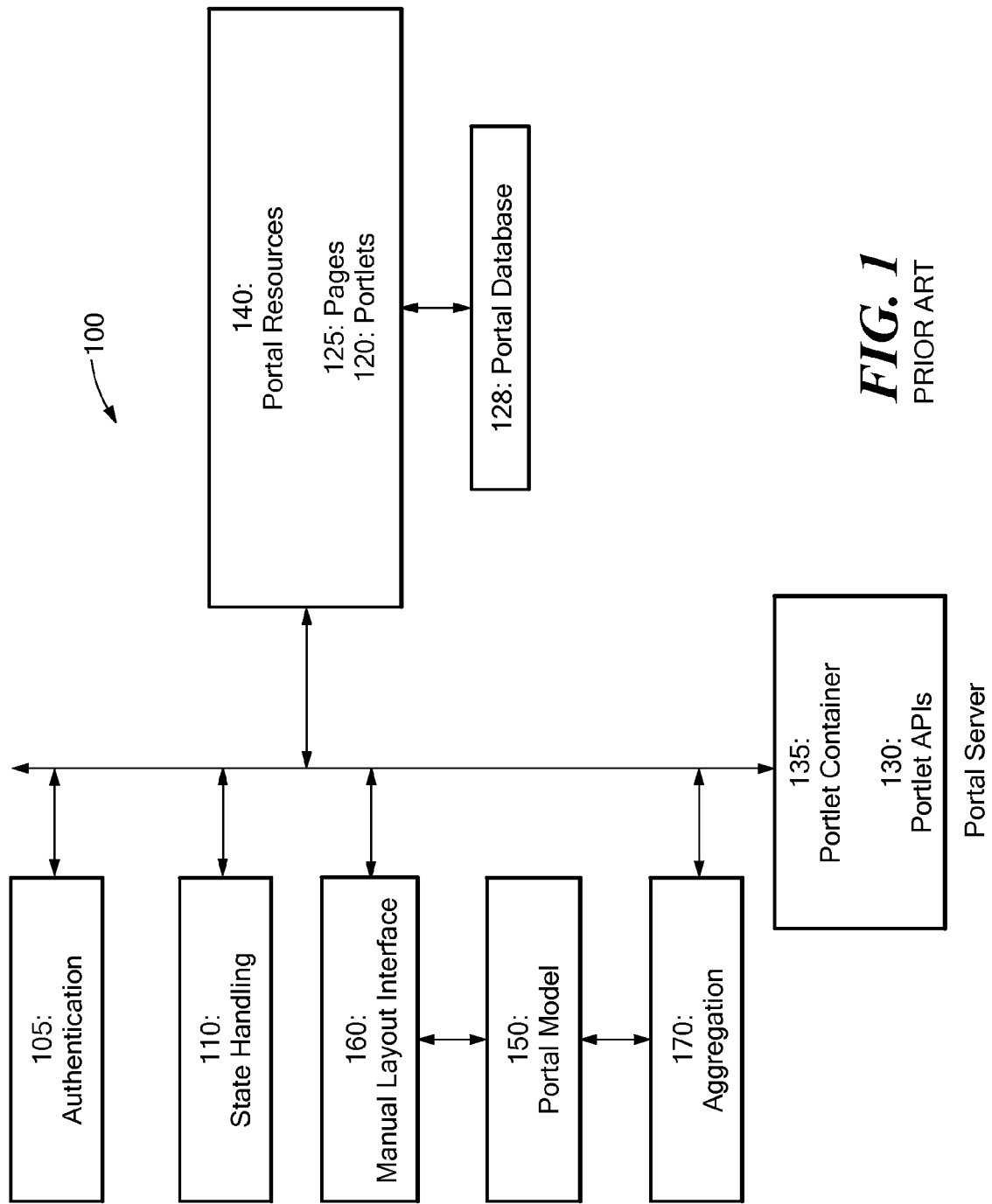
FIG. 1 is a schematic diagram illustrating the structural components of a prior art portal server including lines of interactions.
Figure 2:
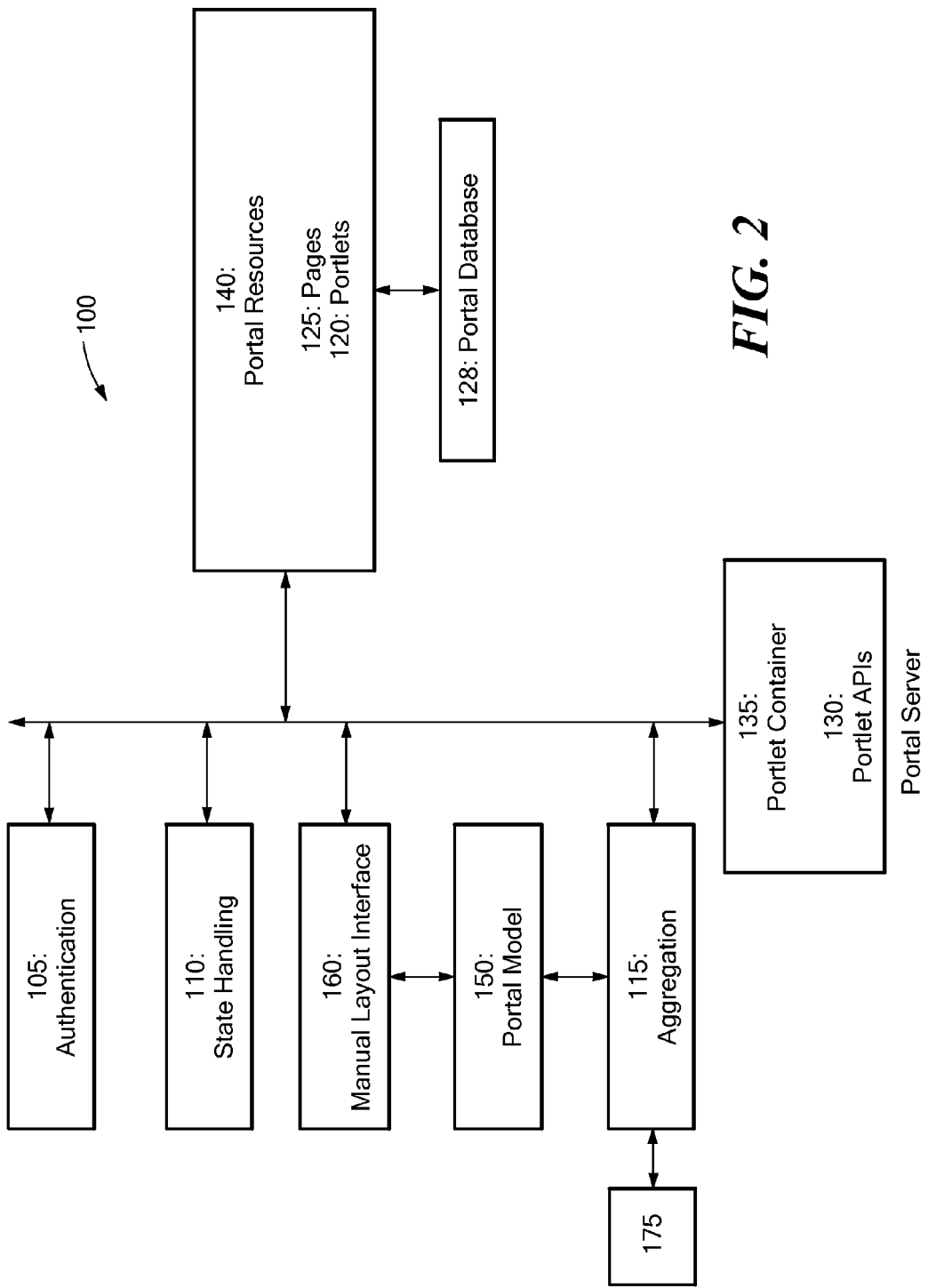
FIG. 2 is a schematic block diagram representation of a portal server according to a specific embodiment of the disclosed system illustrating structural components implemented therein.

In FIG. 2 an embodiment of the disclosed system provides the disclosed features described above at least in part through the component 175. Functional interfaces are provided between the component 175 and the aggregation component 170 as well as to the portlet container 135.

Figure 3:
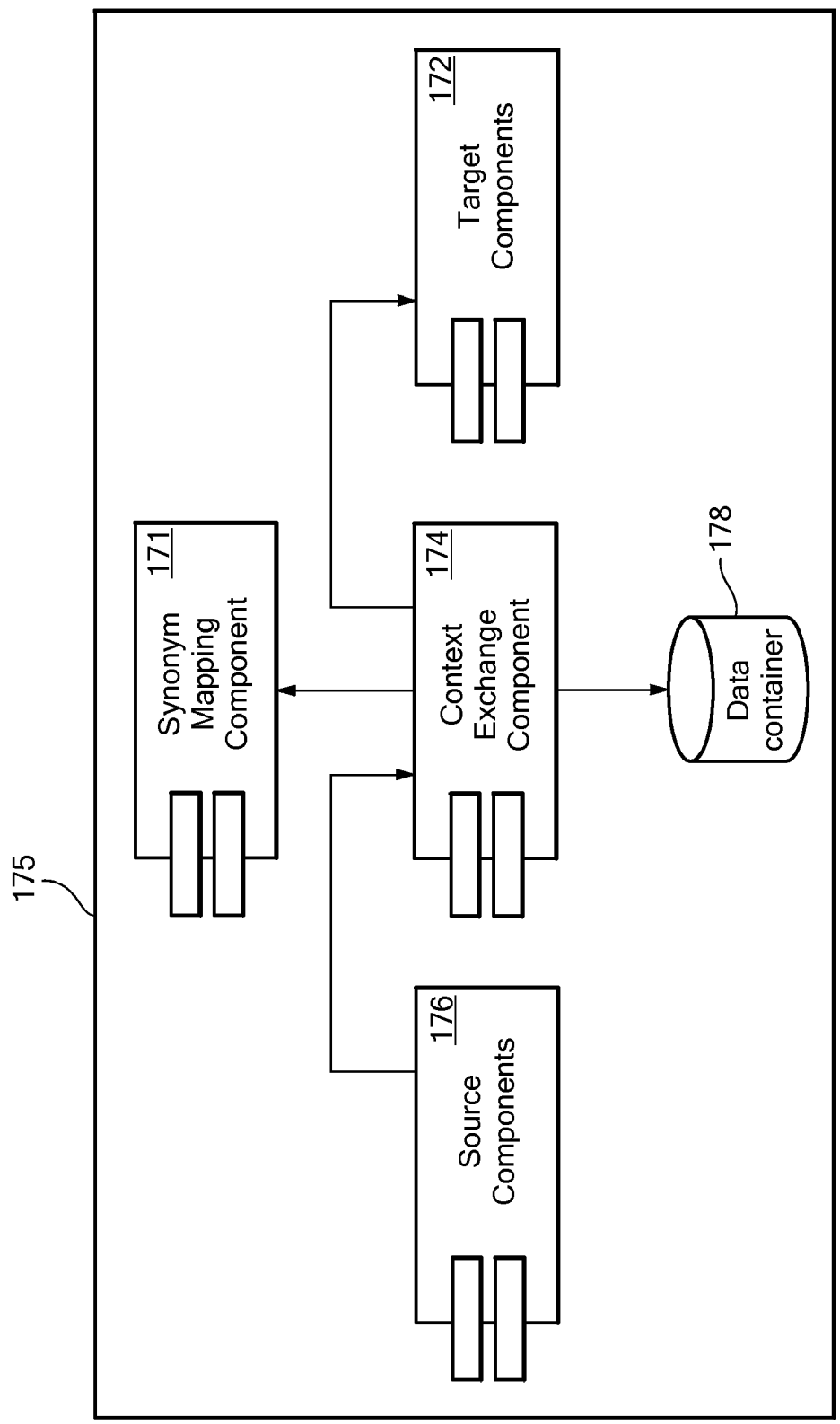
FIG. 3 is a detailed view into an embodiment of the component 175 of FIG. 2, including illustrative functional components in an embodiment of the disclosed system.

With reference now to FIG. 3, an embodiment of the disclosed system 175 includes a context exchange component 174 implementing the functionality of storing context-specific use data as mentioned above, for example customer name, customer address, travel date etc., in a data container 178 in distinct portions provided at least logically in a separated way for each context. Details thereof are illustrated in FIG. 5, wherein context containers 64, 66, 68 and 70 are depicted.

The content exchange component 174 is operatively connected to the data container 178 in order to write new datasets and read datasets therefrom. Further, a listener engine is implemented controlled by component 174, which listens to any action or event thrown by so-called source components 176, which are in most cases applets or portlets (in case of a use of a web portal as a web application). The listened to information is then collected and stored in respective separate context containers 64, 66, 68, and 70 (FIG. 5), i.e. separately as in a separate container for each "business thread". Each thread is identified by a thread ID. The thread ID is automatically generated by the system, or, in an alternative embodiment, the thread ID is generated by the user, for example by typing in the customer name or other customer-specific information. For example, the thread ID can be typed in as MILLER, when the customer's name is David Miller.

Figure 5:
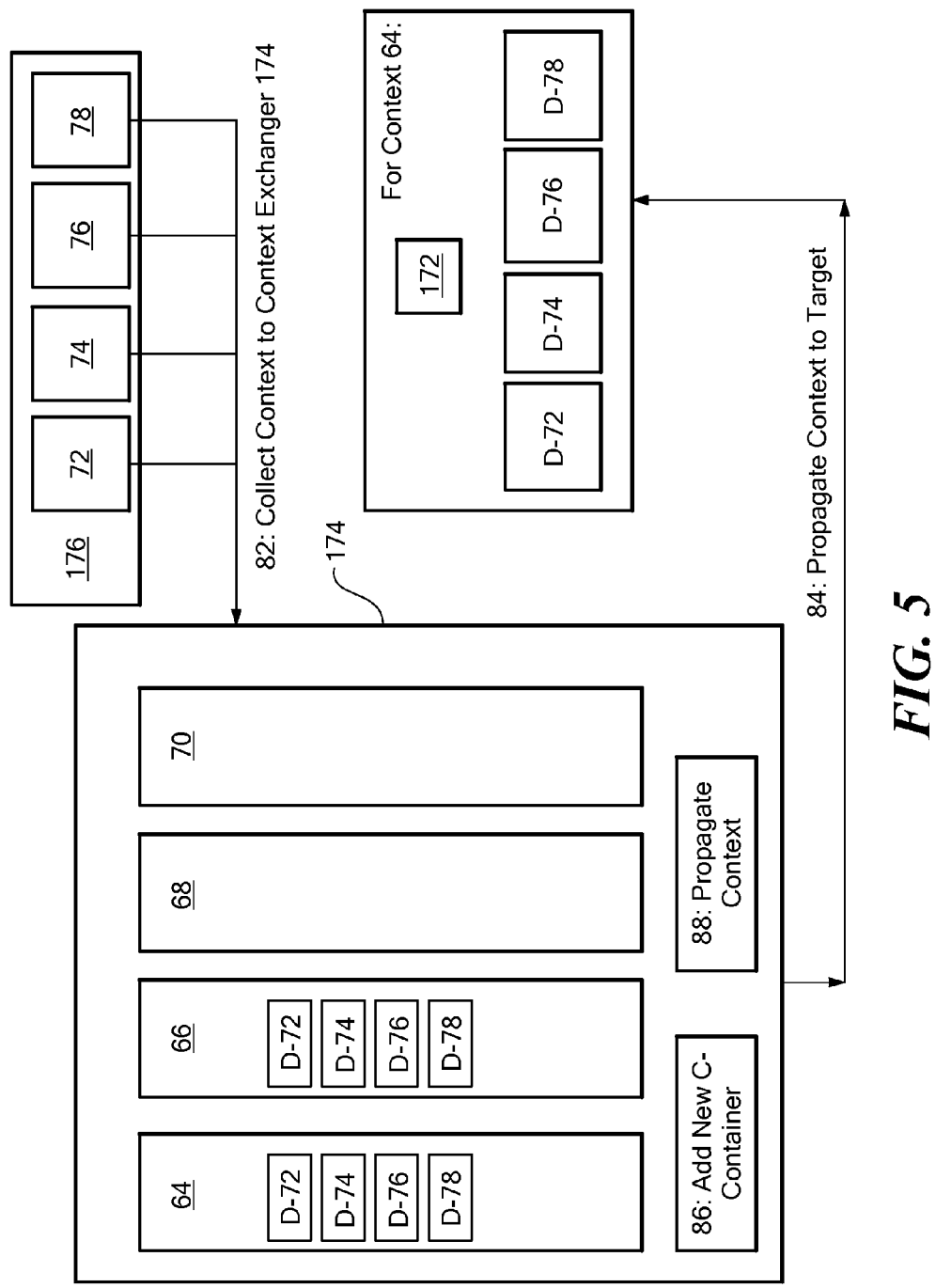
FIG. 5 is a logical view of the disclosed method when used for multiple different contexts in parallel.

As it is also shown in FIG. 5, the user may add a new context container with a functional element 86 "add new context container", just by allocating respective new memory.

Further, the context data D-72, D-74, D-76, and D-78 retrieved from using the source portlets 72, 74, 76 and 78 are collected in respective data slots in the proper context container for a specific customer (see arrow 82).

The user may propagate the context data D-72, D-74, D-76, and D-78 retrieved from respective portlets 72, 74, 76, 78, respectively, acting each as a source component 176, to the target portlet 172, just by a single mouse-click (see arrow 84).

Context exchange component 174 also implements a user interface for implementing the adding or the deleting of, or a change between, different contexts. The user interface may, for example, be implemented just by a dynamic portlet, which pops-up when a certain function key is pressed, and which displays a selection window listing the different existing context names. For example a list of:

Miller context,

Smith context,

Baker context,

Johnson context, can be displayed in order to let the user highlight one of the list items in order to make a respective context active. When the context is active, the data to be listened to immediately after this selection are all collected into this current context.

The context exchange component 174 is further connected to the target components 172, which are basically the target portlets, where the collected data are to be filled in by the disclosed method, preferably in an automated way.

A further synonym matching component 171 is provided having functional interfaces to the context exchange component 174 which implements a list of synonym words, in order to be able to perform a correct clustering of attributes. By means of this feature, the "paste function" is made "smart" in relation to a manually performed copy/paste procedure.

Figure 4:
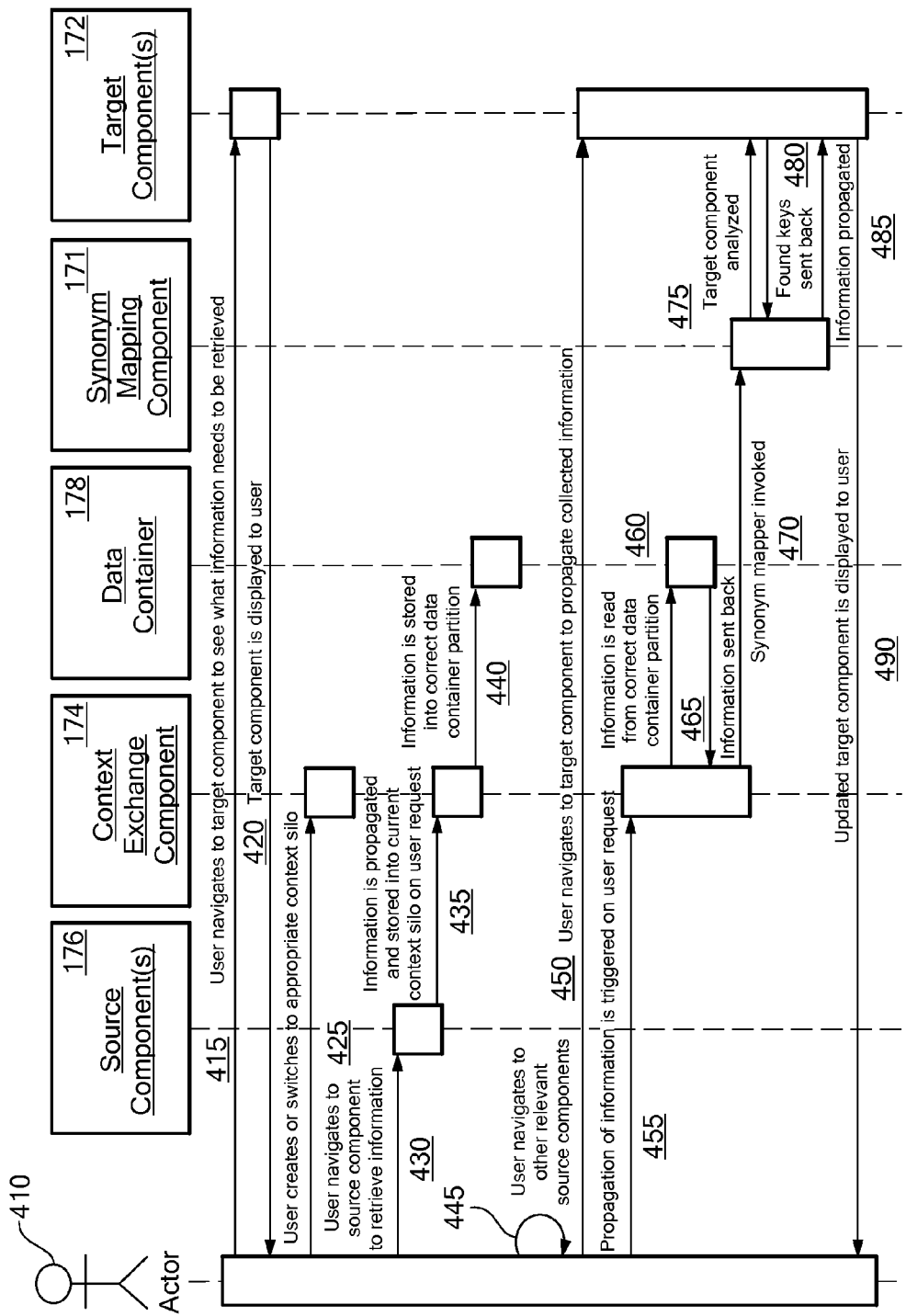
FIG. 4 is an interaction diagram illustrating the interaction between the components shown in FIG. 3 during operation of an embodiment of the disclosed system.

With further reference to FIG. 4, the control flow of the disclosed method is described by using an exemplary workflow, as described next below:

First, a user may be assumed to navigate to the target component in order to see what information needs to be retrieved, step 415. The target component 176 is usually a portlet, which is provided with a plurality of form fields to be filled-in with business data. At the target component the user has an overview, regarding which data to fill-in and which further portlets to visit in order to create these data. In order to do that the target component is of course displayed to the user, in a step 420.

In step 425 the user creates a new context and names this context "Miller", e.g. because that is the customer's name. By this user action a certain storage area is reserved for this specific "Miller-context" in order to be able to receive and store any useful data, as generated by the user or by further portlets of the same Miller-thread during the business step intended for Mr. Miller. In the above example of travel booking, the target component 172 may be a portlet which receives all relevant data for flight booking, hotel booking and rental car booking, and which basically represents the customer's order, which is legally binding the customer, and which is used by the travel agency to bill him.

For example, there might be three source portlets, here referred to as source component(s) 176, namely flight booking, hotel booking and rental car booking portlets.

In a next step 430 the user might be assumed to navigate to the first source component (source portlet) in order to retrieve the information to book a particular flight. The customer may be offered a number of flights, and can be assumed to decide on a certain flight. Then, in a next step 435, the flight election and the associated flight information, such as flight number, departure time and date, airport name, etc., is propagated and stored into the current context container provided and reserved for customer Miller by a mouse click performed by the user via a respectively exposed control, for example provided within the theme of the Web portal used by him. Responsive to this mouse click, all information provided by the flight booking portal is stored into the Miller-container, for example container 64 in FIG. 5, see step 440.

Then, in a further sequence of similar steps, which are depicted as a loop symbol 445 in FIG. 4, the user navigates to the hotel booking portlet, the rental car portlet and maybe to further portlets from which specific further data are generated and propagated and stored in an analogous way as described before with regard to steps 430, 435, 440. Accordingly, the user may be assumed to have booked all three items, namely flight, hotel and rental car, but is distracted now from continuing the work, for example because some other client must be serviced immediately.

Accordingly, the user can create a new context 66 for the new customer, e.g. Mr. Smith, and might perform steps 415 to 440 for customer Smith. In this situation, all individual travel data provided for Mr. Smith are collected and stored in the Smith context container, for example container 66 in FIG. 5. For customer Miller, customer Smith, and potentially a number of further customers, all relevant context-specific information is controlled and stored by the disclosed context exchange component 174 in a respective one of the context containers 64, 66, 68, 70 illustrated in FIG. 5.

Then in a further step 450, a travel agent user of the disclosed method may change the context again to the first Mr. Miller. It should be noted that possibly the booking procedure of Mr. Smith has already been completed. In that case, for Mr. Miller the travel agent navigates again to the target portal at step 450 where he clicks on a user control exposed according to the invention for him to manually trigger the propagation of the collected information from context container 66 into the target portal, and in particular into the correct single input fields provided within this target portlet.

In more detail, a mouse click to invoke the information propagation is depicted at step 455 in FIG. 4. This request from the user is received by the context exchange component 174. According to this embodiment, component 174 reads all collected data from a Miller context 64, since at step 455 the Miller context was made active. Then all collected information is retrieved from the data container 178 and is sent back to the context exchange component 174 (see step 465).

According to this embodiment, an optionally provided synonym mapper component is invoked, which was depicted in FIG. 3 by synonym mapping component 171. Due to the fact that the context information is preferably stored as a pair, i.e. attribute and attribute value, e.g. where attribute="name" and attribute value="Miller", the synonym mapper may detect other attribute definitions for one and the same business item. For example, instead of "name" the synonym "last name" may be detected. To support such synonym detection, for each attribute a list of synonyms is provided. This may include also multi-language features, for example for the most common languages.

Thus, after invocation, the synonym mapping component 171 searches the synonym list for a given attribute and will find the correct attribute definition in order to fill-in the input attribute value under the proper attribute input field in the target portlet. Assume, for example, that the flight number is called "flight number" in the target portal, and is called "flight ID" in the source portal of flight booking. In such a case, the list of synonyms for the item flight number will include the item "flight ID", and potentially including a further list of further synonyms (e.g. abbreviations, etc.), such as, for example "Flight-No.", or "Flight-Numero", "Flugnummer", "Flug", etc. Synonyms in multiple other languages can be included in the list. Accordingly, the synonym-mapping component 171 finds the correct attribute for each portlet-specific attribute definition.

Then, the value of the properly found attribute is transmitted to the target component, i.e. the target portlet. This is repeated for all relevant attributes (see step 475 and step 480). In all these loop iterations the key attributes are sent to the synonym mapping component 171, which retrieves the proper attributes and propagates the correct attributes to the target portlet, accompanied by each attribute value respectively in question (see step 485). Then, in a final step 490, the updated target component is displayed to the user. As a result, the user is presented with a filled-in target portlet, the ordering portlet, as it was discussed above for this example, such that he may have a last confirmatory look at it in order to ensure that no errors are contained within the data set. If he finds any errors, he might easily edit the respective input field, and replace the wrong item with the correct one.

The skilled reader will appreciate that the before-mentioned embodiments showing certain procedures and proposed sequences of steps are primarily given for demonstrating the disclosed method by way of example. Thus, it will be understood that those examples may be varied in various aspects like for example the ordering of steps, the degree of parallelization between steps, the implementation details of the single steps, the form in which data is stored, the way how the grouping of portlets is achieved, etc., and respective further embodiments can be obtained.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions, hardware circuitry, and/or some combination of hardware and software. Computer program instructions that embody such blocks may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method in a Web application environment including Web pages and portlets as Web application elements, for collecting context information and using said collected context information within said Web application environment, comprising:
    defining a storage area for a single thread of processing multiple applets in said Web application;
    listening to events fired by each of said applets used by a user during processing by said multiple applets;
    collecting and storing information associated with said listened to events in said storage area, wherein at least one piece of information is stored as a pair consisting of an attribute and an attribute value;
    clustering said collected and stored information into a plurality of different attributes; and
    propagating said clustered information automatically into said multiple applets.

2. The method of claim 1, wherein said Web application is implemented within a Web Portal application.

3. The method of claim 1, further comprising displaying said clustered information in a theme display area of said Web application.

4. The method of claim 1, further comprising performing synonym matching during said step of clustering said collected information, wherein for a given attribute at least one synonym item is stored.

5. The method of claim 1, further comprising displaying a user control for triggering the step of automatic propagation of said clustered information.

6. The method of claim 5, wherein a plurality of storage areas are provided for receiving information belonging to respective multiple different processing threads.

7. The method of claim 6, wherein for each processing thread a name is displayed to the user.

8. The method of claim 7, wherein the name is implemented as a clickable link, which when clicked, displays the collected information.

9. The method according to claim 8, wherein the displayed thread information is editable by the user for correction purposes, and can be re-propagated in order to overwrite pre-propagated thread information.

10. A Web application server computer system including a computer readable memory, said computer readable memory having stored thereon computer program code for, in a Web application environment including Web pages and portlets as Web application elements, collecting context information and using said collected context information within said Web application environment, said computer program code operable when executed to cause said Web application server computer system to perform context exchange by:

listening to events fired by each of a plurality of applets used by a user during processing by said multiple applets;

collecting and storing information associated with said listened to events in a storage area, wherein at least one piece of information is stored as a pair consisting of an attribute and an attribute value;

clustering said collected and stored information into a plurality of different attributes; and propagating said clustered information automatically into said multiple applets.

11. A computer program product including a computer readable memory, said computer readable memory having program code stored thereon that is operable, when executed, to cause a computer system, including a Web application environment including Web pages and portlets as Web application elements, to collect context information and use said collected context information within said Web application environment, by:

defining a storage area for a single thread of processing of multiple applets in said Web application;

listening to events fired by each of said applets used by a user during processing by said multiple applets;

collecting and storing information associated with said listened events in said storage area, wherein at least one piece of information is stored as a pair consisting of an attribute and an attribute value;

clustering said collected and stored information into a plurality of different attributes; and propagating said clustered information automatically into said multiple applets.

* * * * *